US011868755B2

(12) United States Patent
Vladimerou et al.

(10) Patent No.: US 11,868,755 B2
(45) Date of Patent: Jan. 9, 2024

(54) UPDATING SOFTWARE INSTALLED ON AN ELECTRONIC UNIT ON A VEHICLE

(71) Applicant: Toyota Motor Engineering & Manufacturing North America, Inc., Plano, TX (US)

(72) Inventors: Vladimeros Vladimerou, Whitmore Lake, MI (US); Gregg J. Overfield, Canton, MI (US); Drew Cunningham, Superior Township, MI (US); John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 63 days.

(21) Appl. No.: 17/390,228

(22) Filed: Jul. 30, 2021

(65) Prior Publication Data
US 2023/0036661 A1 Feb. 2, 2023

(51) Int. Cl.
*G06F 8/65* (2018.01)
(52) U.S. Cl.
CPC ...................................... *G06F 8/65* (2013.01)
(58) Field of Classification Search
USPC ........................................................ 717/170
See application file for complete search history.

(56) References Cited

U.S. PATENT DOCUMENTS 9,722,781 B2    8/2017  Smereka et al.
10,489,132 B1  11/2019  Bloomcamp et al.
(Continued)

FOREIGN PATENT DOCUMENTS

KR    20150085898 A    7/2015
KR    20150144623 A   12/2015

OTHER PUBLICATIONS

Simon Alvarez, "Tesla will add features to request software updates, says Elon Musk," Apr. 5, 2018, 5 pages, found at https://www.teslarati.com/tesla-latest-firmware-updates-request/.
(Continued)

*Primary Examiner* — Qing Chen
*Assistant Examiner* — Clint Thatcher
(74) *Attorney, Agent, or Firm* — Christopher G. Darrow; Darrow Mustafa PC

(57) ABSTRACT

A system for updating software installed on an electronic unit on a vehicle can include a processor and a memory. The processor can be disposed on an intermediate communications device. The intermediate communications device can be a mobile device. The memory can store an update request module and an update existence module. The update request module can include instructions that when executed by the processor cause the processor to receive, from the electronic unit on the vehicle, a request for an update of the software. The request can include: (1) an identification of a version of the software currently installed on the electronic unit and (2) a key to specifically identify the electronic unit. The update existence module can include instructions that when executed by the processor cause the processor to receive, from a device associated with development of the software, information about an existence of the update.

20 Claims, 5 Drawing Sheets

(56) References Cited

U.S. PATENT DOCUMENTS

| | | | |
|---|---|---|---|
| 10,834,207 B2 | 11/2020 | Acharya et al. | |
| 2015/0230044 A1 | 8/2015 | Paun | |
| 2016/0170733 A1* | 6/2016 | Martin | G06F 21/602 |
| | | | 713/191 |
| 2016/0335073 A1* | 11/2016 | Hong | H04W 48/18 |
| 2017/0060559 A1* | 3/2017 | Ye | G06F 8/65 |
| 2017/0192770 A1* | 7/2017 | Ujiie | G06F 11/1433 |
| 2018/0108186 A1 | 4/2018 | Lin et al. | |
| 2018/0196656 A1* | 7/2018 | Miller | G06F 8/71 |
| 2018/0217828 A1* | 8/2018 | Madrid | H04L 63/123 |
| 2019/0056923 A1* | 2/2019 | Baba | G06F 9/445 |
| 2019/0281052 A1 | 9/2019 | Lekkas | |
| 2019/0391800 A1* | 12/2019 | Lin | G06F 8/65 |
| 2020/0174778 A1* | 6/2020 | David | H04W 4/80 |
| 2021/0064359 A1 | 3/2021 | Fox | |
| 2021/0155177 A1* | 5/2021 | Harata | B60R 16/0231 |
| 2021/0157570 A1* | 5/2021 | Harata | G06F 8/654 |

OTHER PUBLICATIONS

Unknown, "Multi-ECU Over-the-Air Software Updates for Connected Vehicles," last accessed on Jul. 30, 2021, 2 pages, found at https://www.airbiquity.com/application/files/3914/8961/0533/Airbiquity-ST_SDM_Solution_Collateral.pdf.

Unknown, "Over the Air Vehicle Software Updates (GMC)," last accessed on Jul. 30, 2021, 2 pages, found at https://my.gmc.com/how-to-support/maintenance/over-air-software-updates.

Unknown, "Gateway (computer program)" last accessed on Jul. 30, 2021, 1 page, https://en.wikipedia.org/wiki/Gateway_(computer_program).

Unknown, "Over-the-air programming," last accessed on Jul. 28, 2021, 3 pages, https://en.wikipedia.org/wiki/Over-the-air_programming.

Chris Teague, "How to update Android Auto," Digital Trends, Mar. 11, 2021, 5 pages, found at https://www.digitaltrends.com/cars/how-to-update-android-auto/.

Projjal Gupta, "A decentralized approach towards secure firmware updates and testing over commercial IoT Devices," arXiv:2011.12052v1, Nov. 24, 2020, pp. 1-6.

Baza et al., "Blockchain-based Firmware Update Scheme Tailored for Autonomous Vehicles," 2019 IEEE Wireless Communications and Networking Conference (WCNC), 2019, pp. 1-7.

* cited by examiner

UPDATING SOFTWARE INSTALLED ON AN ELECTRONIC UNIT ON A VEHICLE

TECHNICAL FIELD

The disclosed technologies are directed to updating software installed on an electronic unit on a vehicle.

BACKGROUND

An electronic unit can be disposed on a vehicle. For example, the electronic unit can be an electronic control unit (ECU). For example, the electronic unit can be an embedded system in an automotive electronics system. For example, the electronic unit can be an engine control module, a transmission control module, a brake control module, associated with an in-car entertainment system, or the like. Software can be installed on the electronic unit. For example, the software can be embedded in the electronic unit. For example, the software can be firmware. An entity associated with development of the software can produce the software, can produce an update of the software, can control distribution of the software or the update, or any combination of the foregoing. For example, the entity can be an original equipment manufacturer (OEM) for the software. Distribution of the software or the update can be performed wirelessly. For example, distribution can be performed using an over-the-air (OTA) technique.

SUMMARY

In an embodiment, a system for updating software installed on an electronic unit on a vehicle can include a processor and a memory. The memory can store an update request module and an update existence module. The update request module can include instructions that when executed by the processor cause the processor to receive, from the electronic unit on the vehicle, a request for an update of the software. The request can include: (1) an identification of a version of the software currently installed on the electronic unit and (2) a key to specifically identify the electronic unit. The update existence module can include instructions that when executed by the processor cause the processor to receive, from a device associated with development of the software, information about an existence of the update.

In another embodiment, a method for updating software installed on an electronic unit on a vehicle can include receiving, by a processor and from the electronic unit on the vehicle, a request for an update of the software. The request can include: (1) an identification of a version of the software currently installed on the electronic unit and (2) a key to specifically identify the electronic unit. The method can also include receiving, by the processor and from a device associated with development of the software, information about an existence of the update.

In another embodiment, a non-transitory computer-readable medium for updating software installed on an electronic unit on a vehicle can include instructions that when executed by one or more processors cause the one or more processors to receive, from the electronic unit on the vehicle, a request for an update of the software installed on the electronic unit. The request can include: (1) an identification of a version of the software currently installed on the electronic unit and (2) a key to specifically identify the electronic unit. The non-transitory computer-readable medium can include instructions that when executed by the one or more processors cause the one or more processors to receive, from a device associated with development of the software, information about an existence of the update.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
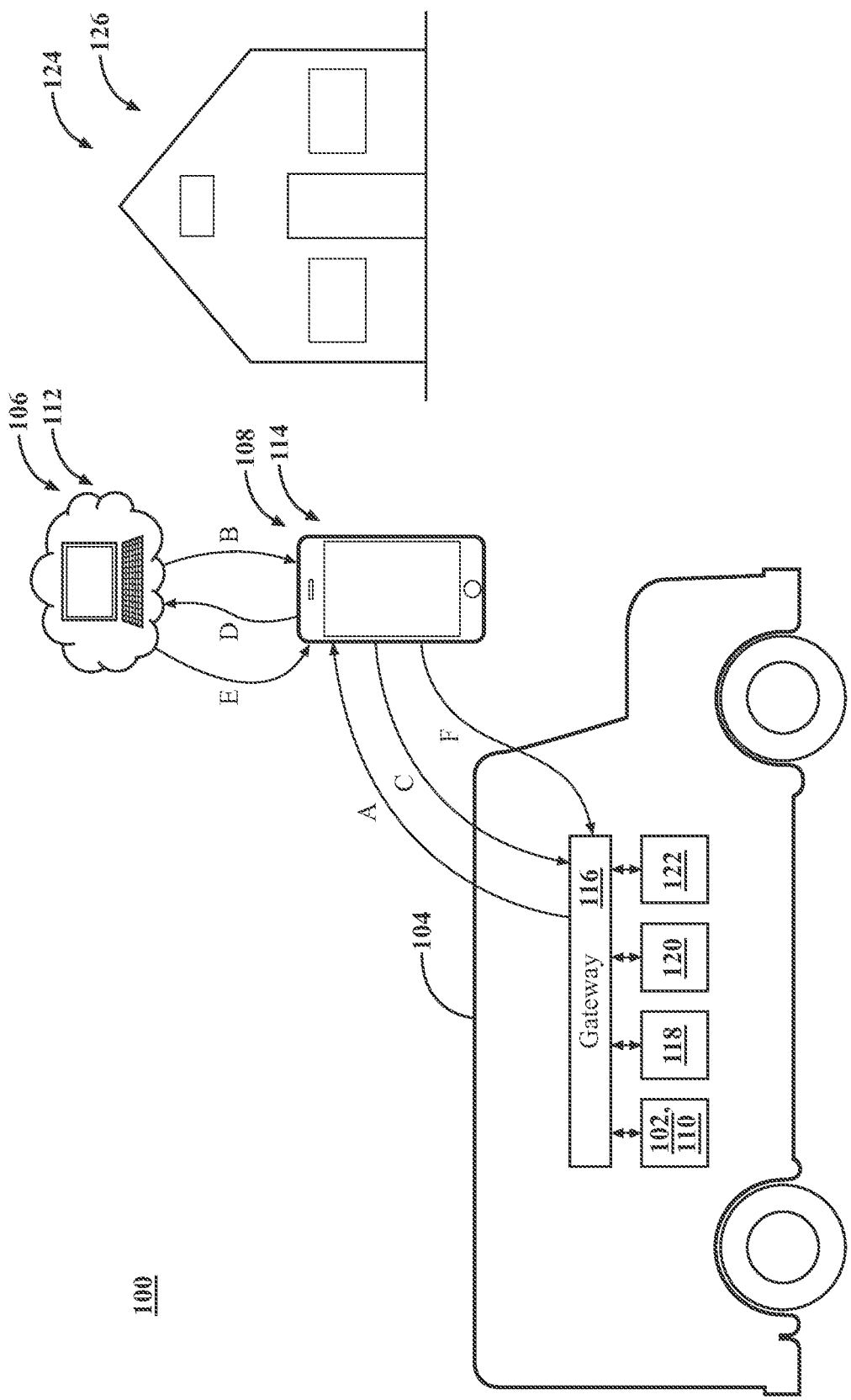
FIG. 1 includes a diagram that illustrates an example of an environment for updating software installed on an electronic unit on a vehicle, according to the disclosed technologies.

Conventionally, software installed on an electronic unit on a vehicle can be updated using an over-the-air (OTA) technique. The update can be transmitted by a device associated with development of the software. For example, the device associated with development of the software can include a server. The update can be received by the vehicle. The vehicle can cause the update to be installed on the electronic unit. Unfortunately, a transmission of the update may require a relatively long duration of time. Additionally, at least a portion of the electronic unit may need to be energized to install the update of the software on the electronic unit. This may require a source of a propulsion force for the vehicle to be in an on state so that the at least the portion of the electronic unit can be energized.

The device associated with development of the software can include, with the transmission of the update, an identification of the electronic unit so that the update can be installed on the electronic unit having the identification. For example, the identification can include a vehicle identification number (VIN) for the vehicle. Unfortunately, the transmission of the vehicle identification number may allow the vehicle identification number to be received by an entity engaged in automotive hacking. With the vehicle identification number, the entity engaged in automotive hacking may cause a malicious code to be transmitted to the vehicle. The malicious code may allow the entity engaged in automotive hacking to commandeer a control of the vehicle such as a steering control, a brake control, or the like. Additionally, because the vehicle identification number is personally identifiable information (PII), the transmission of the vehicle identification number may also allow the vehicle identification number to be received by an entity engaged in identity theft.

The disclosed technologies are directed to updating software installed on an electronic unit on a vehicle. For example, a processor can be disposed on an intermediate communications device. For example, the intermediate communications device can be a mobile device. The processor can receive, from the electronic unit on the vehicle, a request for an update of the software installed on the electronic unit. The request can include: (1) an identification of a version of the software currently installed on the electronic unit and (2) a key to specifically identify the electronic unit. For example, information included in the key can exclude personal data. For example, the personal data can include personally identifiable information. For example, the personal data can include a vehicle identification number for the vehicle. The processor can receive, from a device associated with development of the software, information about an existence of the update. For example, the intermediate communications device can be one or more of: (1) configured to be perceived, by the vehicle, as the device associated with development of the software or (2) configured to be perceived, by the device associated with development of the software, as the vehicle.

Additionally, for example, the processor can receive, from the device associated with development of the software, the update, information that specifically identifies an entity associated with development of the software, and information that specifically identifies the electronic unit. For example, at least the update can be received using a technology configured to transfer data at a rate greater than or equal to a threshold rate (e.g., a Universal Serial Bus cable, WiFi™, Bluetooth®, or the like). For example, the threshold rate can be 250 kilobytes per second. For example, at least the update can be received at a first time. The first time can be a time at which the technology configured to transfer data at the rate greater than or equal to the threshold rate is available (e.g., at a time in which the intermediate communications device is located in a structure having such technology). Additionally, for example, the processor can transmit, to the electronic unit, at least one of the update, the information that specifically identifies an entity associated with development of the software, or the information that specifically identifies the electronic unit. For example, at least the update can be transmitted using the technology configured to transfer data at the rate greater than or equal to the threshold rate (e.g., a Universal Serial Bus cable, WiFi™, Bluetooth®, or the like). For example, the threshold rate can be 250 kilobytes per second. For example, at least the update can be transmitted at a second time. The second time can be a time at which the technology configured to transfer data at the rate greater than or equal to the threshold rate is available (e.g., at a time in which the intermediate communications device is located in the vehicle and the vehicle has such technology). Additionally, for example, the processor can transmit, to the electronic unit, a message configured to cause at least a portion of the electronic unit to be energized. The portion can be necessary to install the update of the software on the electronic unit. For example, the message can be transmitted at the second time. For example, at the second time, the source of the propulsion force for the vehicle can be in an off state.

FIG. 1 includes a diagram that illustrates an example of an environment 100 for updating software installed on an electronic unit 102 on a vehicle 104, according to the disclosed technologies. For example, the environment 100 can include: (1) a device 106 associated with development of the software and (2) an intermediate communications device 108. For example, the electronic unit 102 can be an electronic control unit (ECU) 110. For example, the device 106 can include a server 112. For example, the intermediate communications device 108 can include a mobile device 114. Additionally, for example, the environment 100 can include a gateway 116 on the vehicle 104. The gateway 116 can be communicably connected to at least the electronic unit 102 (e.g., the electronic control unit (ECU) 110). For example, the gateway can be communicably connected to the electronic unit 102 (e.g., the electronic control unit (ECU) 110), a second electronic unit 118, a third electronic unit 120, and a fourth electronic unit 122. For example, the electronic unit 102 (e.g., the electronic control unit (ECU) 110) can be an engine control module, the second electronic unit 118 can be a transmission control module, the third electronic unit 120 can be a brake control module, and the fourth electronic unit 122 can be an electronic unit associated with an in-car entertainment system. Additionally, for example, the environment 100 can include a structure 124 having a technology configured to transfer data at a rate greater than or equal to a threshold rate (e.g., a Universal Serial Bus cable, WiFi™, Bluetooth®, or the like). For example, the structure 124 can include a house 126. For example, the house 126 can be associated with an operator of the vehicle 104.

Figure 2:
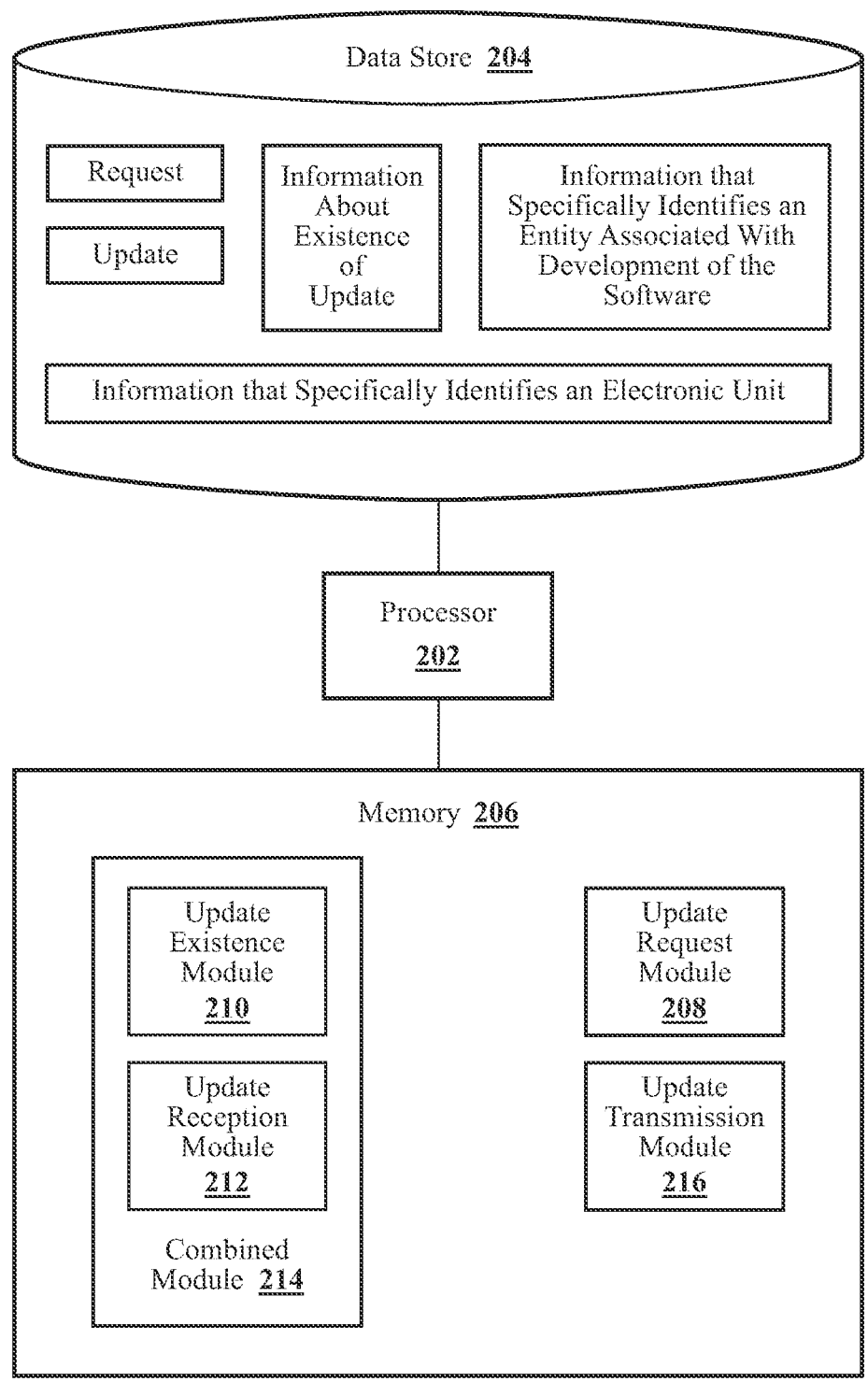
FIG. 2 includes a block diagram that illustrates an example of a system for updating software installed on an electronic unit on a vehicle, according to the disclosed technologies.

FIG. 2 includes a block diagram that illustrates an example of a system 200 for updating software installed on an electronic unit on a vehicle, according to the disclosed technologies. The system 200 can include, for example, a processor 202, a data store 204, and a memory 206. The data store 204 can be communicably coupled to the processor 202. The memory 206 can be communicably coupled to the processor 202. For example, the memory 206 can store an update request module 208 and an update existence module 210. For example, the system 200 can be disposed on an intermediate communications device. For example, the intermediate communications device can include a mobile device.

The update request module 208 can include instructions that function to control the processor 202 to receive, from the electronic unit on the vehicle, a request for an update of the software installed on the electronic unit. For example, the electronic unit can be an electronic control unit (ECU). For example, the request can be stored in the data store 204. With reference to FIG. 1, for example, the intermediate communications device 108 (e.g., the mobile device 114) can receive (A), from the electronic unit 102 (e.g., the electronic control unit (ECU) 110) on the vehicle 104, the request for the update of the software installed on the electronic unit 102.

Returning to FIG. 2, the request can include: (1) an identification of a version of the software currently installed on the electronic unit and (2) a key to specifically identify the electronic unit. For example, information included in the key can exclude personal data. For example, the personal data can include personally identifiable information (PII). For example, the personal data can include a vehicle identification number (VIN) for the vehicle. For example, the key can be produced by applying a hash function to an identification number that specifically identifies the electronic unit. For example, the request can be encrypted.

In a configuration, the instructions to receive the request can be performed using a technology configured to transfer data at a rate greater than or equal to a threshold rate (e.g., a Universal Serial Bus cable, WiFi™, Bluetooth®, or the like). For example, the threshold rate can be 250 kilobytes per second.

The update existence module 210 can include instructions that function to control the processor 202 to receive, from a device associated with development of the software, information about an existence of the update. For example, the device associated with development of the software can include a server. For example, the information about the existence of the update can be stored in the data store 204. With reference to FIG. 1, for example, the intermediate communications device 108 (e.g., the mobile device 114) can receive (B), from the device 106 (e.g., the server 112), the information about the existence of the update.

Returning to FIG. 2, for example, the device associated with development of the software can decrypt the request. For example, the device associated with development of the software can produce the identification number that specifically identifies the electronic unit by applying a dehash function to the key included in the request. For example, the device associated with development of the software can use: (1) the identification number that specifically identifies the electronic unit and (2) the identification of the version of the software currently installed on the electronic unit, which are included in the request, to determine the existence of an update for the software currently installed on the electronic unit. With reference to FIG. 1, for example, the intermediate communications device 108 (e.g., the mobile device 114) can: (1) transmit (D), in response to the receipt of the request, the request to the device 106 (e.g., the server 112) and (2) receive (B), from the device 106 and after the request has been transmitted to the device 106, the information about the existence of the update.

In a configuration, the instructions to receive the information can be performed using the technology configured to transfer data at the rate greater than or equal to the threshold rate (e.g., a Universal Serial Bus cable, WiFi™, Bluetooth®, or the like). For example, the threshold rate can be 250 kilobytes per second.

For example, the intermediate communications device can be one or more of configured to be perceived: (1) by the vehicle, as the device associated with development of the software or (2) by the device associated with development of the software, as the vehicle.

In a configuration, the update request module 208 can further includes instructions that function to control the processor 202 to establish a communications connection between the processor 202 and a gateway on the vehicle. The gateway can be communicably connected to at least the electronic unit. With reference to FIG. 1, for example, the intermediate communications device 108 (e.g., the mobile device 114) can establish the communications connection between the intermediate communications device 108 and the gateway 116 on the vehicle 104.

Returning to FIG. 2, in a configuration, the update request module 208 can further include instructions that function to control the processor 202 to transmit, to the electronic unit, a message configured to determine an existence of the request. For example, the instructions to transmit the message can include instructions to transmit, in response to an existence of a condition, the message. For example, the existence of the condition can be an existence of a connection between a Universal Serial Bus cable and a port, a strength of a WiFi™ signal being greater than a threshold WiFi™ signal strength, a strength of a Bluetooth® signal being greater than a threshold Bluetooth® signal strength, a time of day being a time of day at which a source of a propulsion force for the vehicle is in an off state, or the like. With reference to FIG. 1, for example, the intermediate communications device 108 (e.g., the mobile device 114) can transmit (C), to the electronic unit 102 (e.g., the electronic control unit (ECU) 110), the message configured to determine the existence of the request. For example, a transmission of the message can be performed before a reception of the request.

Additionally, for example, in a configuration in which the communications connection is established between the processor 202 and the gateway on the vehicle: (1) the instructions to transmit the message can include instructions to transmit, to the gateway, one or more messages and (2) the instructions to receive the request can include instructions to receive, from the gateway, one or more requests. With reference to FIG. 1, for example, the intermediate communications device 108 (e.g., the mobile device 114) can: (1) transmit (C), to the gateway 116, the one or more messages configured to determine the existence of the one or more requests and (2) receive (A), from the gateway 116, the one or more requests. For example, the gateway 116 can transmit the one or more messages to one or more of the electronic unit 102, the second electronic unit 118, the third electronic unit 120, or the fourth electronic unit 122. For example, the gateway 116 can receive the one or more requests from the one or more of the electronic unit 102, the second electronic unit 118, the third electronic unit 120, or the fourth electronic unit 122. For example: (1) the electronic unit 102 (e.g., the electronic control unit (ECU) 110) for an engine control module can have a request for an update of the software installed on the electronic unit 102 and (2) the fourth electronic unit 122 for an in-car entertainment system can have a request for an update of the software installed on the fourth electronic unit 122, but (3) the second electronic unit 118 for a transmission control module can lack having a request for an update of the software installed on the second electronic unit 118 and (4) the third electronic unit 120 for a brake control module can lack having a request for an update of the software installed on the third electronic unit 120.

Returning to FIG. 2, in a configuration, the update existence module 210 can further include instructions that function to control the processor 202 to transmit, to the device associated with development of the software, a message configured to determine the existence of the update. For example, the instructions to transmit the message can include instructions to transmit, in response to an existence of a condition, the message. For example, the existence of the condition can be an existence of a connection between a Universal Serial Bus cable and a port, a strength of a WiFi™ signal being greater than a threshold WiFi™ signal strength, a strength of a Bluetooth® signal being greater than a threshold Bluetooth® signal strength, a time of day being a time of day at which a source of a propulsion force for the vehicle is in an off state, or the like. With reference to FIG. 1, for example, the intermediate communications device 108 (e.g., the mobile device 114) can transmit (D), to the device 106 (e.g., the server 112), the message configured to determine the existence of the update. For example, a transmission of the message can be performed before a reception of the information about the existence of the update.

Returning to FIG. 2, in a configuration, the update request module 208 can further include instructions that function to control the processor 202 to transmit the request to the device associated with development of the software. For example, the instructions to transmit the request can include instructions to transmit, in response to a receipt of the request, the request. Alternatively, for example, the instructions to transmit the request can include instructions to transmit, in response to a receipt of the information about the existence of the update, the request. With reference to FIG. 1, for example, the intermediate communications device 108 (e.g., the mobile device 114) can transmit (D) the request to the device 106 (e.g., the server 112).

Returning to FIG. 2, in a configuration, the memory 206 can further store an update reception module 212. The update reception module 212 can include instructions that function to control the processor 202 to receive, from the device associated with development of the software: (1) the update, (2) information that specifically identifies an entity associated with development of the software, and (3) information that specifically identifies the electronic unit. For example, (1) the update, (2) the information that specifically identifies the entity associated with development of the software, and (3) the information that specifically identifies the electronic unit can be stored in the data store 204. For example, the information that specifically identifies the electronic unit can be the identification number that specifically identifies the electronic unit. For example, one or more of the update, the information that specifically identifies the entity associated with development of the software, or the information that specifically identifies the electronic unit can be encrypted. With reference to FIG. 1, for example, the intermediate communications device 108 (e.g., the mobile device 114) can receive (E), from the device 106 (e.g., the server 112): (1) the update, (2) the information that specifically identifies the entity associated with development of the software, and (3) the information that specifically identifies the electronic unit 102 (e.g., the electronic control unit (ECU) 110).

Returning to FIG. 2, in a configuration, the information about the existence of the update can include the update. For example, the instructions included in the update existence module 210 and the instructions included in the update reception module 212 can be included in a combined module 214.

In a configuration, at least the instructions to receive the update can be performed using a technology configured to transfer data at a rate greater than or equal to a threshold rate (e.g., a Universal Serial Bus cable, WiFi™, Bluetooth®, or the like). For example, the threshold rate can be 250 kilobytes per second. For example, at least the update can be received at a first time. The first time can be a time at which the technology configured to transfer data at the rate greater than or equal to the threshold rate is available (e.g., at a time in which the intermediate communications device is located in a structure having such technology). With reference to FIG. 1, for example, the intermediate communications device 108 (e.g., the mobile device 114) can receive, from the device 106 (e.g., the server 112), the update at a time in which the intermediate communications device 108 is located in the structure 124 (e.g., the house 126), which has the technology configured to transfer data at the rate greater than or equal to the threshold rate (e.g., a Universal Serial Bus cable, WiFi™, Bluetooth®, or the like).

Returning to FIG. 2, in a configuration, the memory 206 can further store an update transmission module 216. The update transmission module 216 can include instructions that function to control the processor 202 to transmit, to the electronic unit, one or more of: (1) the update, (2) the information that specifically identifies the entity associated with development of the software, or (3) the information that specifically identifies the electronic unit. With reference to FIG. 1, for example, the intermediate communications device 108 (e.g., the mobile device 114) can transmit (F), to the electronic unit 102 (e.g., the electronic control unit (ECU) 110), one or more of: (1) the update, (2) the information that specifically identifies the entity associated with development of the software, or (3) the information that specifically identifies the electronic unit 102 (e.g., the electronic control unit (ECU) 110).

Returning to FIG. 2, for example, the electronic unit can decrypt one or more of the update, the information that specifically identifies the entity associated with development of the software, or the information that specifically identifies the electronic unit. For example, the electronic unit can use: (1) the information that specifically identifies the electronic unit to confirm that the update is intended for the software currently installed on the electronic unit and (2) the information that specifically identifies the entity associated with development of the software to confirm an authenticity of the update.

In a configuration, at least the instructions to transmit the update can be performed using a technology configured to transfer data at a rate greater than or equal to a threshold rate (e.g., a Universal Serial Bus cable, WiFi™, Bluetooth®, or the like). For example, the threshold rate can be 250 kilobytes per second. For example, at least the update can be transmitted at a second time. The second time can be a time at which the technology configured to transfer data at the rate greater than or equal to the threshold rate is available (e.g., at a time in which the intermediate communications device is located in the vehicle and the vehicle has such technology). With reference to FIG. 1, for example, the intermediate communications device 108 (e.g., the mobile device 114) can transmit, to the electronic unit 102 (e.g., the electronic control unit (ECU) 110), the update at a time in which the intermediate communications device 108 is located in the vehicle 104 and the vehicle 104 has the technology configured to transfer data at the rate greater than or equal to the threshold rate (e.g., a Universal Serial Bus cable, WiFi™, Bluetooth®, or the like).

Returning to FIG. 2, in a configuration, the update transmission module 216 can further include instructions that function to control the processor 202 to transmit, to the electronic unit, a message configured to cause at least a portion of the electronic unit to be energized. The portion can be necessary to install the update of the software on the electronic unit. For example, the message can be transmitted at the second time. For example, at the second time, the source of the propulsion force for the vehicle can be in an off state.

Figure 3A:
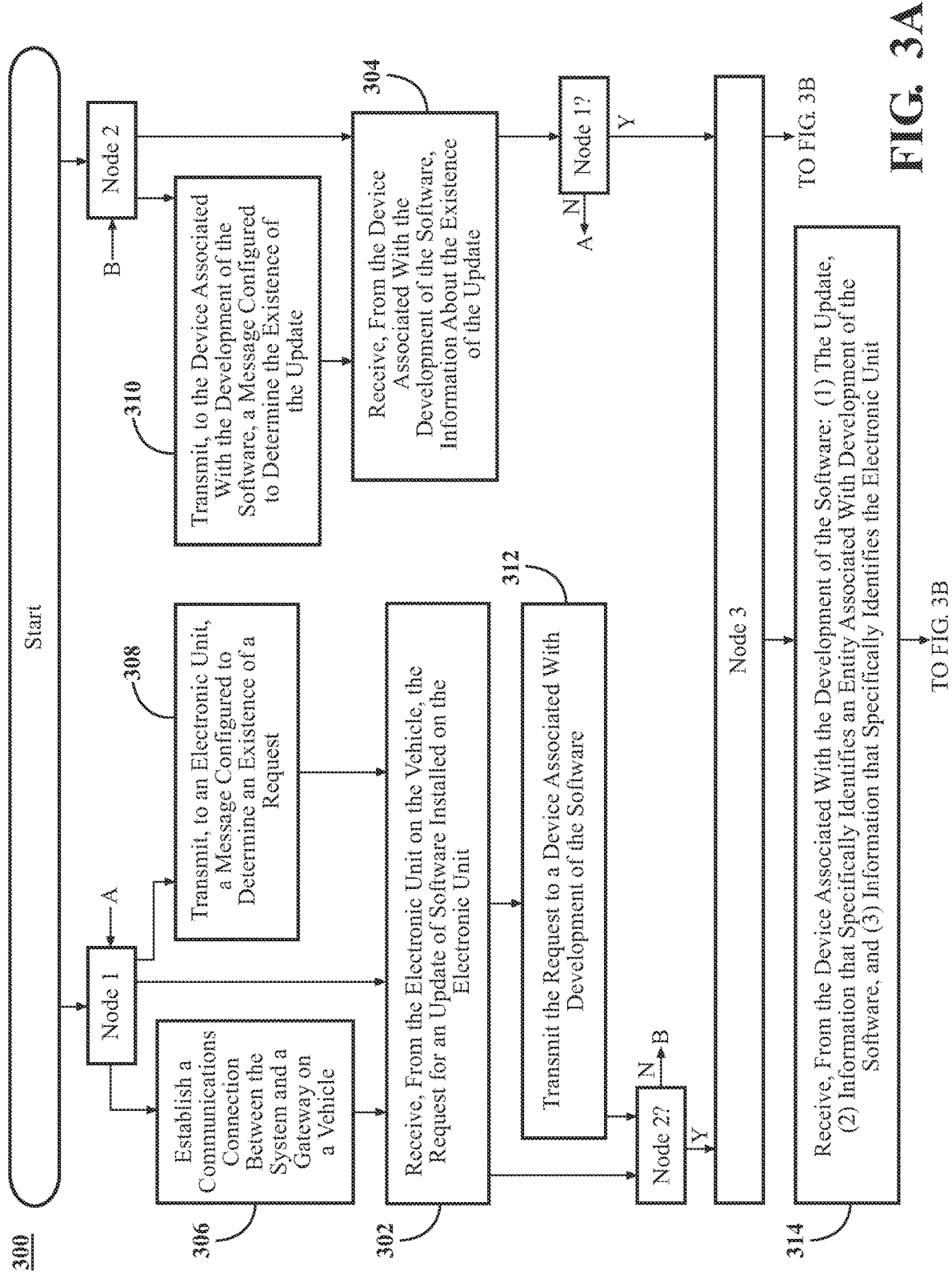
FIGS. 3A and 3B are a flow diagram that illustrates an example of a method that is associated with updating the software installed on the electronic unit on the vehicle, according to the disclosed technologies.
Figure 3B:
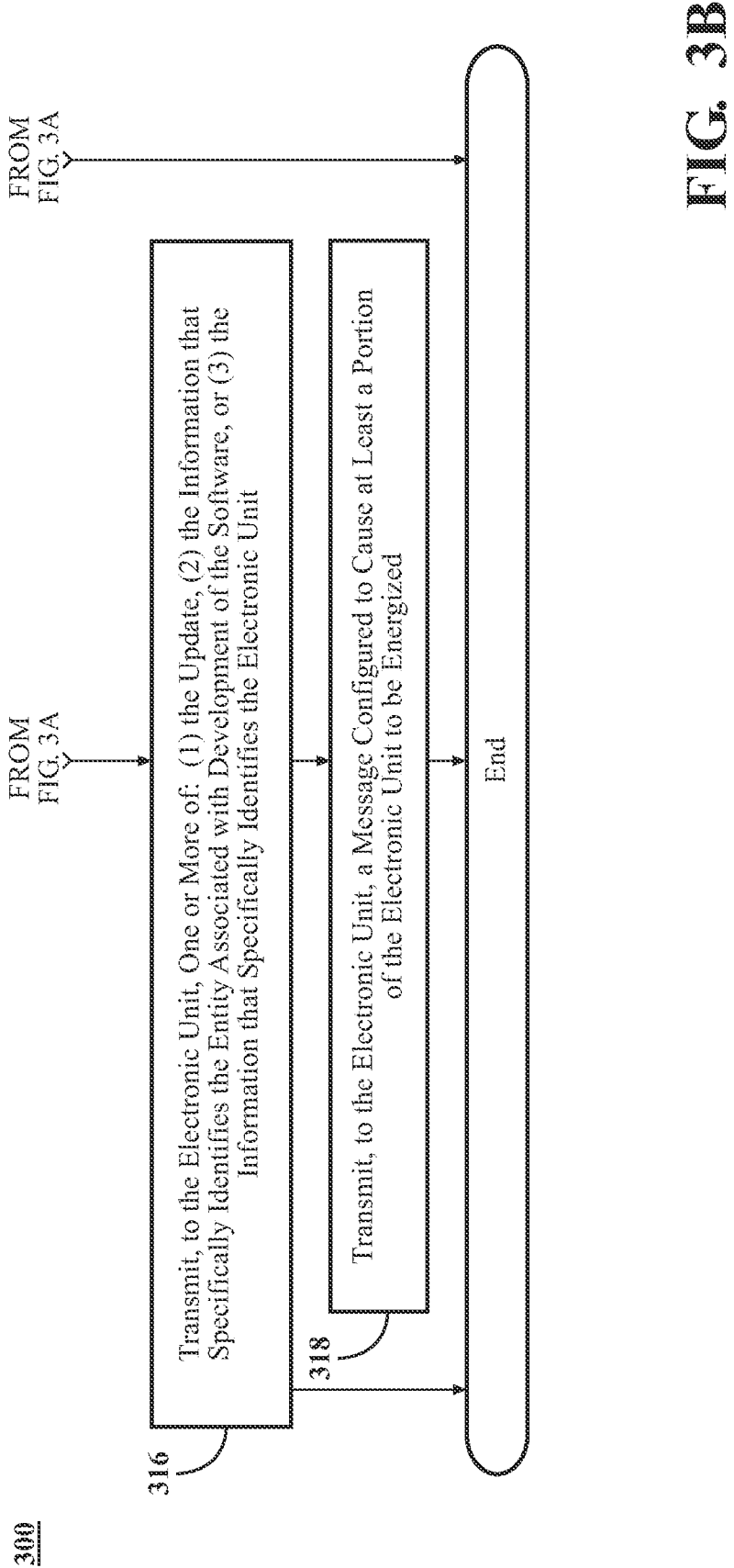

FIGS. 3A and 3B are a flow diagram that illustrates an example of a method 300 that is associated with updating the software installed on the electronic unit on the vehicle, according to the disclosed technologies. The method 300 is described from the perspective of the system 200 illustrated in FIG. 2. Although the method 300 is described in combination with the system 200 illustrated in FIG. 2, one of skill in the art understands, in light of the description herein, that the method 300 is not limited to being implemented by the system 200 illustrated in FIG. 2. Rather, the system 200 illustrated in FIG. 2 is an example of a system that may be used to implement the method 300. Additionally, although the method 300 is illustrated as a generally serial process, various aspects of the method 300 may be able to be executed in parallel. For example, the system 200 can be disposed on an intermediate communications device. For example, the intermediate communications device can include a mobile device.

In FIG. 3A, in the method 300, at an operation 302, for example, the update request module 208 can receive, from the electronic unit on the vehicle, a request for an update of the software installed on the electronic unit. For example, the electronic unit can be an electronic control unit (ECU). The request can include: (1) an identification of a version of the software currently installed on the electronic unit and (2) a key to specifically identify the electronic unit. For example, information included in the key can exclude personal data. For example, the personal data can include personally identifiable information (PII). For example, the personal data can include a vehicle identification number (VIN) for the vehicle. For example, the key can be produced by applying a hash function to an identification number that specifically identifies the electronic unit. For example, the request can be encrypted.

In a configuration, the update request module 208 can receive the request using a technology configured to transfer data at a rate greater than or equal to a threshold rate (e.g., a Universal Serial Bus cable, WiFi™, Bluetooth®, or the like). For example, the threshold rate can be 250 kilobytes per second.

At an operation 304, for example, the update existence module 210 can receive, from a device associated with development of the software, information about an existence of the update. For example, the device associated with development of the software can include a server. For example, the device associated with development of the software can decrypt the request. For example, the device associated with development of the software can produce the identification number that specifically identifies the electronic unit by applying a dehash function to the key included in the request. For example, the device associated with development of the software can use: (1) the identification number that specifically identifies the electronic unit and (2) the identification of the version of the software currently installed on the electronic unit, which are included in the request, to determine the existence of an update for the software currently installed on the electronic unit.

In a configuration, the update existence module 210 can receive the information using the technology configured to transfer data at the rate greater than or equal to the threshold rate (e.g., a Universal Serial Bus cable, WiFi™, Bluetooth®, or the like). For example, the threshold rate can be 250 kilobytes per second.

For example, the system 200 can be one or more of configured to be perceived: (1) by the vehicle, as the device associated with development of the software or (2) by the device associated with development of the software, as the vehicle.

In a configuration, at an operation 306, the update request module 208 can establish a communications connection between the system 200 and a gateway on the vehicle. The gateway can be communicably connected to at least the electronic unit.

In a configuration, at an operation 308, the update request module 208 can transmit, to the electronic unit, a message configured to determine an existence of the request. For example, the update request module 208 can transmit, in response to an existence of a condition, the message. For example, the existence of the condition can be an existence of a connection between a Universal Serial Bus cable and a port, a strength of a WiFi™ signal being greater than a threshold WiFi™ signal strength, a strength of a Bluetooth® signal being greater than a threshold Bluetooth® signal strength, a time of day being a time of day at which a source of a propulsion force for the vehicle is in an off state, or the like.

For example, in a configuration in which the communications connection is established between the system 200 and the gateway on the vehicle: (1) the update request module 208 can transmit, to the gateway, one or more messages and (2) the update request module 208 can receive, from the gateway, one or more requests.

In a configuration, at an operation 310, the update existence module 210 can transmit, to the device associated with development of the software, a message configured to determine the existence of the update. For example, the update existence module 210 can transmit, in response to an existence of a condition, the message. For example, the existence of the condition can be an existence of a connection between a Universal Serial Bus cable and a port, a strength of a WiFi™ signal being greater than a threshold WiFi™ signal strength, a strength of a Bluetooth® signal being greater than a threshold Bluetooth® signal strength, a time of day being a time of day at which a source of a propulsion force for the vehicle is in an off state, or the like.

In a configuration, at an operation 312, the update request module 208 can transmit the request to the device associated with development of the software. For example, the update request module 208 can transmit, in response to a receipt of the request, the request. Alternatively, for example, the update request module 208 can transmit, in response to a receipt of the information about the existence of the update, the request.

In a configuration, at an operation 314, the update reception module 212 can receive, from the device associated with development of the software: (1) the update, (2) information that specifically identifies an entity associated with development of the software, and (3) information that specifically identifies the electronic unit. For example, the information that specifically identifies the electronic unit can be the identification number that specifically identifies the electronic unit. For example, one or more of the update, the information that specifically identifies the entity associated with development of the software, or the information that specifically identifies the electronic unit can be encrypted.

In a configuration, the information about the existence of the update can include the update.

In a configuration, the update reception module 212 can receive at least the update using a technology configured to transfer data at a rate greater than or equal to a threshold rate (e.g., a Universal Serial Bus cable, WiFi™, Bluetooth®, or the like). For example, the threshold rate can be 250 kilobytes per second. For example, at least the update can be received at a first time. The first time can be a time at which the technology configured to transfer data at the rate greater than or equal to the threshold rate is available (e.g., at a time in which the system 200 is located in a structure having such technology).

In FIG. 3B, in the method 300, in a configuration, at an operation 316, the update transmission module 216 can transmit, to the electronic unit, one or more of: (1) the update, (2) the information that specifically identifies the entity associated with development of the software, or (3) the information that specifically identifies the electronic unit.

For example, the electronic unit can decrypt one or more of the update, the information that specifically identifies the entity associated with development of the software, or the information that specifically identifies the electronic unit. For example, the electronic unit can use: (1) the information that specifically identifies the electronic unit to confirm that the update is intended for the software currently installed on the electronic unit and (2) the information that specifically identifies the entity associated with development of the software to confirm an authenticity of the update.

In a configuration, the update transmission module 216 can transmit the update using a technology configured to transfer data at a rate greater than or equal to a threshold rate (e.g., a Universal Serial Bus cable, WiFi™, Bluetooth®, or the like). For example, the threshold rate can be 250 kilobytes per second. For example, at least the update can be transmitted at a second time. The second time can be a time at which the technology configured to transfer data at the rate greater than or equal to the threshold rate is available (e.g., at a time in which the system 200 is located in the vehicle and the vehicle has such technology).

In a configuration, at an operation 318, the update transmission module 216 can transmit, to the electronic unit, a message configured to cause at least a portion of the electronic unit to be energized. The portion can be necessary to install the update of the software on the electronic unit. For example, the message can be transmitted at the second time. For example, at the second time, the source of the propulsion force for the vehicle can be in an off state.

Figure 4:
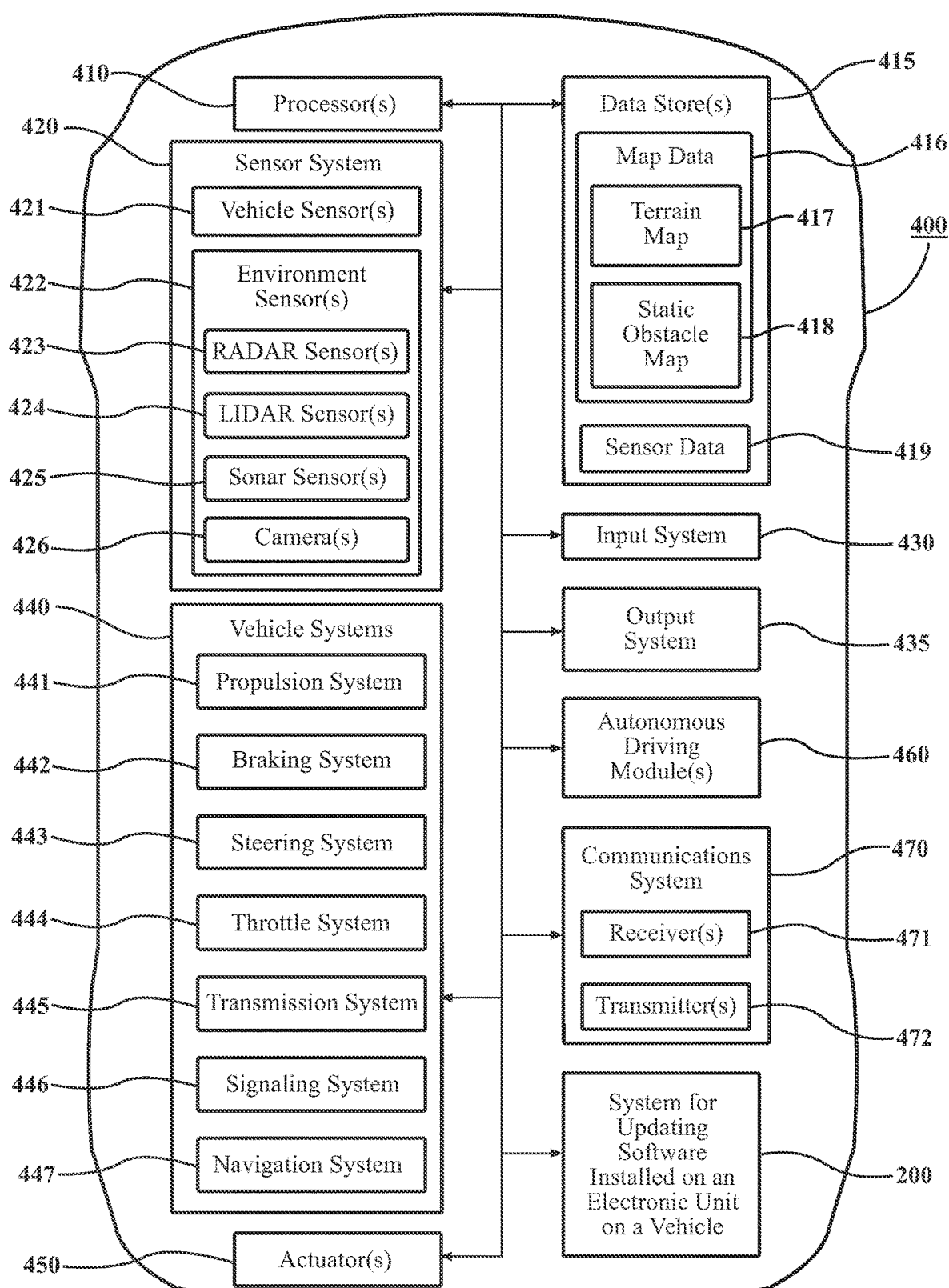
FIG. 4 includes a block diagram that illustrates an example of elements disposed on a vehicle, according to the disclosed technologies.

FIG. 4 includes a block diagram that illustrates an example of elements disposed on a vehicle 400, according to the disclosed technologies. As used herein, a "vehicle" can be any form of powered transport. In one or more implementations, the vehicle 400 can be an automobile. While arrangements described herein are with respect to automobiles, one of skill in the art understands, in light of the description herein, that embodiments are not limited to automobiles.

In some embodiments, the vehicle 400 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 400 is performed according to inputs received from a user (e.g., human driver). In one or more arrangements, the vehicle 400 can be a conventional vehicle that is configured to operate in only a manual mode.

In one or more embodiments, the vehicle 400 can be an automated vehicle. As used herein, "automated vehicle" can refer to a vehicle that operates in an automated mode. As used herein, "automated mode" can refer to navigating and/or maneuvering the vehicle 400 along a travel route using one or more computing systems to control the vehicle 400 with minimal or no input from a human driver. In one or more embodiments, the vehicle 400 can be highly automated or completely automated. In one embodiment, the vehicle 400 can be configured with one or more semi-automated operational modes in which one or more computing systems perform a portion of the navigation and/or maneuvering of the vehicle along a travel route, and a vehicle operator (i.e., driver) provides inputs to the vehicle 400 to perform a portion of the navigation and/or maneuvering of the vehicle 400 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 400 can include various elements. The vehicle 400 can have any combination of the various elements illustrated in FIG. 4. In various embodiments, it may not be necessary for the vehicle 400 to include all of the elements illustrated in FIG. 4. Furthermore, the vehicle 400 can have elements in addition to those illustrated in FIG. 4. While the various elements are illustrated in FIG. 4 as being located within the vehicle 400, one or more of these elements can be located external to the vehicle 400. Furthermore, the elements illustrated may be physically separated by large distances. For example, as described, one or more components of the disclosed system can be implemented within the vehicle 400 while other components of the system can be implemented within a cloud-computing environment, as described below. For example, the elements can include one or more processors 410, one or more data stores 415, a sensor system 420, an input system 430, an output system 435, vehicle systems 440, one or more actuators 450, one or more automated driving modules 460, a communications system 470, and the system 200 for verifying an object recognition determination.

In one or more arrangements, the one or more processors 410 can be a main processor of the vehicle 400. For example, the one or more processors 410 can be an electronic control unit (ECU). For example, functions and/or operations of the processor 202 (illustrated in FIG. 2) can be realized by the one or more processors 410.

The one or more data stores 415 can store, for example, one or more types of data. For example, functions and/or operations of the data store 204, the memory 206 (illustrated in FIG. 2), or any combination thereof can be realized by the one or more data stores 415. The one or more data stores 415 can include volatile memory and/or non-volatile memory. Examples of suitable memory for the one or more data stores 415 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 415 can be a component of the one or more processors 410. Additionally or alternatively, the one or more data stores 415 can be operatively connected to the one or more processors 410 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 415 can store map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain maps 417. The one or more terrain maps 417 can include information about the ground, terrain, roads, surfaces, and/or other features of one or more geographic areas. The one or more terrain maps 417 can include elevation data of the one or more geographic areas. The map data 416 can be high quality and/or highly detailed. The one or more terrain maps 417 can define one or more ground surfaces, which can include paved roads, unpaved roads, land, and other things that define a ground surface.

In one or more arrangements, the map data 416 can include one or more static obstacle maps 418. The one or more static obstacle maps 418 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 418 can have location data, size data, dimension data, material data, and/or other data associated with them. The one or more static obstacle maps 418 can include measurements, dimensions, distances, and/or information for one or more static obstacles. The one or more static obstacle maps 418 can be high quality and/or highly detailed. The one or more static obstacle maps 418 can be updated to reflect changes within a mapped area.

In one or more arrangements, the one or more data stores 415 can store sensor data 419. As used herein, "sensor data" can refer to any information about the sensors with which the vehicle 400 can be equipped including the capabilities of and other information about such sensors. The sensor data 419 can relate to one or more sensors of the sensor system 420. For example, in one or more arrangements, the sensor data 419 can include information about one or more lidar sensors 424 of the sensor system 420.

In some arrangements, at least a portion of the map data 416 and/or the sensor data 419 can be located in one or more data stores 415 that are located onboard the vehicle 400. Alternatively or additionally, at least a portion of the map data 416 and/or the sensor data 419 can be located in one or more data stores 415 that are located remotely from the vehicle 400.

The sensor system 420 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 420 includes a plurality of sensors, the sensors can work independently from each other. Alternatively, two or more of the sensors can work in combination with each other. In such a case, the two or more sensors can form a sensor network. The sensor system 420 and/or the one or more sensors can be operatively connected to the one or more processors 410, the one or more data stores 415, and/or another element of the vehicle 400 (including any of the elements illustrated in FIG. 4). The sensor system 420 can acquire data of at least a portion of the external environment of the vehicle 400 (e.g., nearby vehicles). The sensor system 420 can include any suitable type of sensor. Various examples of different types of sensors are described herein. However, one of skill in the art understands that the embodiments are not limited to the particular sensors described herein.

The sensor system 420 can include one or more vehicle sensors 421. The one or more vehicle sensors 421 can detect, determine, and/or sense information about the vehicle 400 itself. In one or more arrangements, the one or more vehicle sensors 421 can be configured to detect and/or sense position and orientation changes of the vehicle 400 such as, for example, based on inertial acceleration. In one or more arrangements, the one or more vehicle sensors 421 can include one or more accelerometers, one or more gyroscopes, an inertial measurement unit (IMU), a dead-reckoning system, a global navigation satellite system (GNSS), a global positioning system (GPS), a navigation system 447, and/or other suitable sensors. The one or more vehicle sensors 421 can be configured to detect and/or sense one or more characteristics of the vehicle 400. In one or more arrangements, the one or more vehicle sensors 421 can include a speedometer to determine a current speed of the vehicle 400.

Alternatively or additionally, the sensor system 420 can include one or more environment sensors 422 configured to acquire and/or sense driving environment data. As used herein, "driving environment data" can include data or information about the external environment in which a vehicle is located or one or more portions thereof. For example, the one or more environment sensors 422 can be configured to detect, quantify, and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify, and/or sense other things in the external environment of the vehicle 400 such as, for example, lane markers, signs, traffic lights, traffic signs, lane lines, crosswalks, curbs proximate the vehicle 400, off-road objects, etc.

Various examples of sensors of the sensor system 420 are described herein. The example sensors may be part of the one or more vehicle sensors 421 and/or the one or more environment sensors 422. However, one of skill in the art understands that the embodiments are not limited to the particular sensors described.

In one or more arrangements, the one or more environment sensors 422 can include one or more radar sensors 423, one or more lidar sensors 424, one or more sonar sensors 425, and/or one more cameras 426. In one or more arrangements, the one or more cameras 426 can be one or more high dynamic range (HDR) cameras or one or more infrared (IR) cameras. For example, the one or more cameras 426 can be used to record a reality of a state of an item of information that can appear in the digital map.

The input system 430 can include any device, component, system, element, arrangement, or groups thereof that enable information/data to be entered into a machine. The input system 430 can receive an input from a vehicle passenger (e.g., a driver or a passenger). The output system 435 can include any device, component, system, element, arrangement, or groups thereof that enable information/data to be presented to a vehicle passenger (e.g., a driver or a passenger).

Various examples of the one or more vehicle systems 440 are illustrated in FIG. 4. However, one of skill in the art understands that the vehicle 400 can include more, fewer, or different vehicle systems. Although particular vehicle systems can be separately defined, each or any of the systems or portions thereof may be otherwise combined or segregated via hardware and/or software within the vehicle 400. For example, the one or more vehicle systems 440 can include a propulsion system 441, a braking system 442, a steering system 443, a throttle system 444, a transmission system 445, a signaling system 446, and/or the navigation system 447. Each of these systems can include one or more devices, components, and/or a combination thereof, now known or later developed. For example, functions and/or operations of: (1) the electronic unit 102 (illustrated in FIG. 1) can be realized by the propulsion system 441, (2) the second electronic unit 118 (illustrated in FIG. 1) can be realized by the transmission system 445, and (3) the third electronic unit 120 (illustrated in FIG. 1) can be realized by the braking system 442.

The navigation system 447 can include one or more devices, applications, and/or combinations thereof, now known or later developed, configured to determine the geographic location of the vehicle 400 and/or to determine a travel route for the vehicle 400. The navigation system 447 can include one or more mapping applications to determine a travel route for the vehicle 400. The navigation system 447 can include a global positioning system, a local positioning system, a geolocation system, and/or a combination thereof.

The one or more actuators 450 can be any element or combination of elements operable to modify, adjust, and/or alter one or more of the vehicle systems 440 or components thereof responsive to receiving signals or other inputs from the one or more processors 410 and/or the one or more automated driving modules 460. Any suitable actuator can be used. For example, the one or more actuators 450 can include motors, pneumatic actuators, hydraulic pistons, relays, solenoids, and/or piezoelectric actuators.

The one or more processors 410 and/or the one or more automated driving modules 460 can be operatively connected to communicate with the various vehicle systems 440 and/or individual components thereof. For example, the one or more processors 410 and/or the one or more automated driving modules 460 can be in communication to send and/or receive information from the various vehicle systems 440 to control the movement, speed, maneuvering, heading, direction, etc. of the vehicle 400. The one or more processors 410 and/or the one or more automated driving modules 460 may control some or all of these vehicle systems 440 and, thus, may be partially or fully automated.

The one or more processors 410 and/or the one or more automated driving modules 460 may be operable to control the navigation and/or maneuvering of the vehicle 400 by controlling one or more of the vehicle systems 440 and/or components thereof. For example, when operating in an automated mode, the one or more processors 410 and/or the one or more automated driving modules 460 can control the direction and/or speed of the vehicle 400. The one or more processors 410 and/or the one or more automated driving modules 460 can cause the vehicle 400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 470 can include one or more receivers 471 and/or one or more transmitters 472. The communications system 470 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 470 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The vehicle 400 can include one or more modules, at least some of which are described herein. The modules can be implemented as computer-readable program code that, when executed by the one or more processors 410, implement one or more of the various processes described herein. One or more of the modules can be a component of the one or more processors 410. Alternatively or additionally, one or more of the modules can be executed on and/or distributed among other processing systems to which the one or more processors 410 can be operatively connected. The modules can include instructions (e.g., program logic) executable by the one or more processors 410. Alternatively or additionally, the one or more data store 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 400 can include one or more automated driving modules 460. The one or more automated driving modules 460 can be configured to receive data from the sensor system 420 and/or any other type of system capable of capturing information relating to the vehicle 400 and/or the external environment of the vehicle 400. In one or more arrangements, the one or more automated driving modules 460 can use such data to generate one or more driving scene models. The one or more automated driving modules 460 can determine position and velocity of the vehicle 400. The one or more automated driving modules 460 can determine the location of obstacles, obstacles, or other environmental features including traffic signs, trees, shrubs, neighboring vehicles, pedestrians, etc.

The one or more automated driving modules 460 can be configured to receive and/or determine location information for obstacles within the external environment of the vehicle 400 for use by the one or more processors 410 and/or one or more of the modules described herein to estimate position and orientation of the vehicle 400, vehicle position in global coordinates based on signals from a plurality of satellites, or any other data and/or signals that could be used to determine the current state of the vehicle 400 or determine the position of the vehicle 400 with respect to its environment for use in either creating a map or determining the position of the vehicle 400 in respect to map data.

The one or more automated driving modules 460 can be configured to determine one or more travel paths, current automated driving maneuvers for the vehicle 400, future automated driving maneuvers and/or modifications to current automated driving maneuvers based on data acquired by the sensor system 420, driving scene models, and/or data from any other suitable source such as determinations from the sensor data 419. As used herein, "driving maneuver" can refer to one or more actions that affect the movement of a vehicle. Examples of driving maneuvers include: accelerating, decelerating, braking, turning, moving in a lateral direction of the vehicle 400, changing travel lanes, merging into a travel lane, and/or reversing, just to name a few possibilities. The one or more automated driving modules 460 can be configured to implement determined driving maneuvers. The one or more automated driving modules 460 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 460 can be configured to execute various vehicle functions and/or to transmit data to, receive data from, interact with, and/or control the vehicle 400 or one or more systems thereof (e.g., one or more of vehicle systems 440). For example, functions and/or operations of an automotive navigation system can be realized by the one or more automated driving modules 460.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1, 2, 3A, 3B, and 4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
an update request module including instructions that when executed by the processor cause the processor to:
transmit, to an electronic unit on a vehicle and in response to an existence of a condition, a message configured to determine an existence of a request for an update of a software installed on the electronic unit; and
receive, from the electronic unit, the request, the request including:
an identification of a version of the software currently installed on the electronic unit, and
a key to specifically identify the electronic unit; and
an update existence module including instructions that when executed by the processor cause the processor to receive, from a device associated with development of the software, information about an existence of the update,
wherein the existence of the condition comprises at least one of an existence of a connection between a Universal Serial Bus cable and a port, a strength of a WiFi™ signal being greater than a threshold WiFi™ signal strength, a strength of a Bluetooth® signal being greater than a threshold Bluetooth® signal strength, or a time of day being a time of day at which a source of a propulsion force for the vehicle is in an off state, and
wherein the system is disposed on an intermediate communications device, the intermediate communications device being separate from both the vehicle and the device associated with the development of the software.

2. A system, comprising:
a processor; and
a memory storing:
an update request module including instructions that when executed by the processor cause the processor to receive, from an electronic unit on a vehicle, a request for an update of a software installed on the electronic unit, the request including:
an identification of a version of the software currently installed on the electronic unit, and
a key to specifically identify the electronic unit; and
an update existence module including instructions that when executed by the processor cause the processor to:
transmit, to a device associated with development of the software and in response to an existence of a condition, a message configured to determine an existence of the update; and
receive, from the device associated with development of the software, information about the existence of the update,
wherein the existence of the condition comprises at least one of an existence of a connection between a Universal Serial Bus cable and a port, a strength of a WiFi™ signal being greater than a threshold WiFi™ signal strength, a strength of a Bluetooth® signal being greater than a threshold Bluetooth® signal strength, or a time of day being a time of day at which a source of a propulsion force for the vehicle is in an off state, and
wherein the system is disposed on an intermediate communications device, the intermediate communications device being separate from both the vehicle and the device associated with the development of the software.

3. The system of claim 1, wherein the update request module further includes instructions that when executed by the processor cause the processor to transmit the request to the device associated with development of the software.

4. The system of claim 3, wherein the instructions to transmit the request include instructions to transmit, in response to a receipt of the request, the request.

5. The system of claim 3, wherein the instructions to transmit the request include instructions to transmit, in response to a receipt of the information about the existence of the update, the request.

6. The system of claim 1, wherein the memory further stores an update reception module including instructions that when executed by the processor cause the processor to receive, from the device associated with development of the software, the update, information that specifically identifies an entity associated with development of the software, and information that specifically identifies the electronic unit.

7. The system of claim 6, wherein at least the instructions to receive the update are performed using a technology configured to transfer data at a rate greater than or equal to a threshold rate.

8. The system of claim 7, wherein the threshold rate is 250 kilobytes per second.

9. The system of claim 6, wherein the memory further stores an update transmission module including instructions that when executed by the processor cause the processor to transmit, to the electronic unit, at least one of the update, the information that specifically identifies an entity associated with development of the software, or the information that specifically identifies the electronic unit.

10. The system of claim 9, wherein the update transmission module further includes instructions that when executed by the processor cause the processor to transmit, to the electronic unit, a message configured to cause at least a portion of the electronic unit to be energized, the portion being necessary to install the update of the software on the electronic unit.

11. A method, comprising:
transmitting, by a processor and to an electronic unit on a vehicle and in response to an existence of a condition, a message configured to determine an existence of a request for an update of a software installed on the electronic unit;
receiving, by the processor and from the electronic unit, the request, the request including:
an identification of a version of the software currently installed on the electronic unit, and
a key to specifically identify the electronic unit; and
receiving, by the processor and from a device associated with development of the software, information about an existence of the update,
wherein the existence of the condition comprises at least one of an existence of a connection between a Universal Serial Bus cable and a port, a strength of a WiFi™ signal being greater than a threshold WiFi™ signal strength, a strength of a Bluetooth® signal being greater than a threshold Bluetooth® signal strength, or a time of day being a time of day at which a source of a propulsion force for the vehicle is in an off state, and
wherein the transmitting the message, the receiving the request, and the receiving the information are performed on an intermediate communications device, the intermediate communications device being separate from both the vehicle and the device associated with the development of the software.

12. The method of claim 11, wherein information included in the key excludes personal data.

13. The method of claim 12, wherein the personal data include a vehicle identification number for the vehicle.

14. The method of claim 11, wherein the information about the existence of the update comprises the update.

15. A non-transitory computer-readable medium for updating software installed on an electronic unit on a vehicle, the non-transitory computer-readable medium including instructions that when executed by one or more processors cause the one or more processors to:
transmit, to an electronic unit on a vehicle and in response to an existence of a condition, a message configured to determine an existence of a request for an update of a software installed on the electronic unit;
receive, from the electronic unit, the request, the request including:
an identification of a version of the software currently installed on the electronic unit, and
a key to specifically identify the electronic unit; and
receive, from a device associated with development of the software, information about an existence of the update,
wherein the existence of the condition comprises at least one of an existence of a connection between a Universal Serial Bus cable and a port, a strength of a WiFi™ signal being greater than a threshold WiFi™ signal strength, a strength of a Bluetooth® signal being greater than a threshold Bluetooth® signal strength, or a time of day being a time of day at which a source of a propulsion force for the vehicle is in an off state, and
wherein the instructions are configured to be performed on an intermediate communications device, the intermediate communications device being separate from both the vehicle and the device associated with the development of the software.

16. The system of claim 1, wherein the intermediate communications device comprises a mobile device.

17. The system of claim 1, wherein the key is produced by applying a hash function to an identification number that specifically identifies the electronic unit.

18. The system of claim 1, wherein the request is encrypted.

19. The system of claim 6, wherein at least one of the update, the information that specifically identifies the entity associated with development of the software, or the information that specifically identifies the electronic unit is encrypted.

20. The system of claim 10, wherein the instructions to transmit the message configured to cause the at least the portion of the electronic unit to be energized include instructions to transmit, a time at which the source of the propulsion force for the vehicle is in the off state, the message configured to cause the at least the portion of the electronic unit to be energized.

* * * * *